March 23, 1954 — E. C. SHAW — 2,672,672
MANUFACTURE OF FIBROUS MATERIAL IN SHEET FORM
Filed Oct. 5, 1949 — 4 Sheets-Sheet 1

Inventor
Ernest C. Shaw
By:- Mann and Brown
Attys.

March 23, 1954  E. C. SHAW  2,672,672
MANUFACTURE OF FIBROUS MATERIAL IN SHEET FORM
Filed Oct. 5, 1949  4 Sheets-Sheet 2
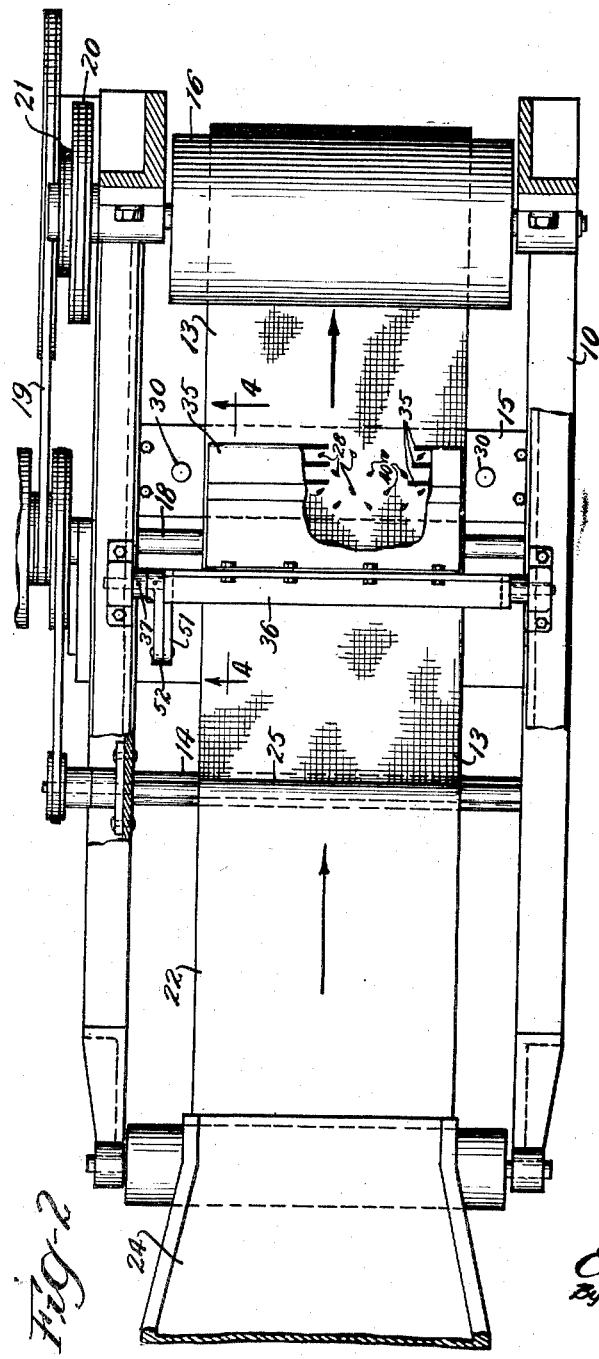
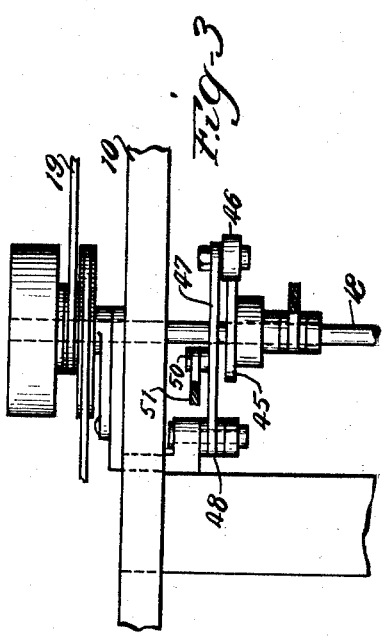
Inventor
Ernest C. Shaw
By
Mann and Brown
Atty's.

March 23, 1954  E. C. SHAW  2,672,672
MANUFACTURE OF FIBROUS MATERIAL IN SHEET FORM
Filed Oct. 5, 1949  4 Sheets-Sheet 3
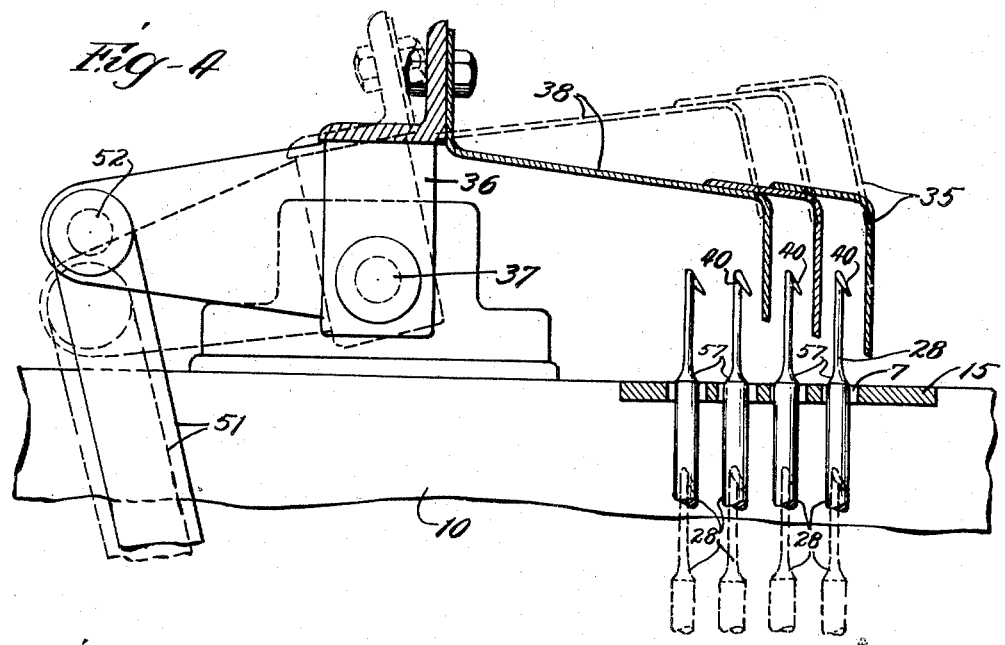
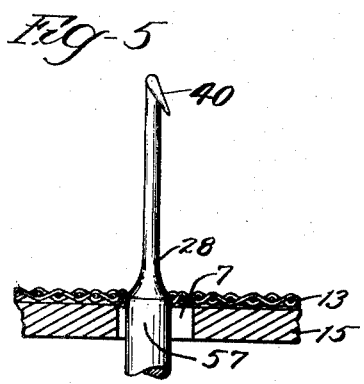
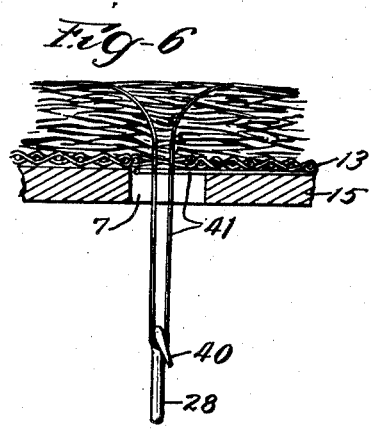
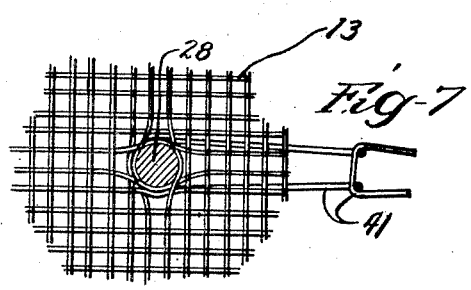
Inventor
Ernest C. Shaw
By:- Mann and Brown
Attys.

March 23, 1954  E. C. SHAW  2,672,672
MANUFACTURE OF FIBROUS MATERIAL IN SHEET FORM
Filed Oct. 5, 1949  4 Sheets-Sheet 4

Inventor
Ernest C. Shaw
By:- Mann and Brown
Attys.

Patented Mar. 23, 1954

2,672,672

UNITED STATES PATENT OFFICE 2,672,672

MANUFACTURE OF FIBROUS MATERIAL IN SHEET FORM

Ernest C. Shaw, Flossmoor, Ill.

Application October 5, 1949, Serial No. 119,602

11 Claims. (Cl. 28—4)

This invention relates to material for oil filter packing, lubricating pads, wiping mitts, and such like including layers of woven fabric and unwoven fiber fastened together in sheet form adapted to be rolled, folded, piled, or otherwise used where oil and such like are to be filtered, absorbed, fed, or wiped.

Generally speaking, the material is made by feeding a woven fabric and a layer of unwoven waste together and hooking threads of the waste through the fabric to fasten them together.

In the drawings:

Fig. 2 is a plan view of the same;

Fig. 3 is a section on the line 3—3 of Fig. 1;

Fig. 4 is a section on the line 4—4 of Fig. 2;

Fig. 5 is an enlargement of a portion of Fig. 4 showing one of the needles and the associated parts;

Fig. 6 is a similar view with the needle in a different position pulling a loop of waste through the fabric and the hooking bar;

Fig. 7 is an enlarged plan view corresponding to Fig. 5;

Figure 1:
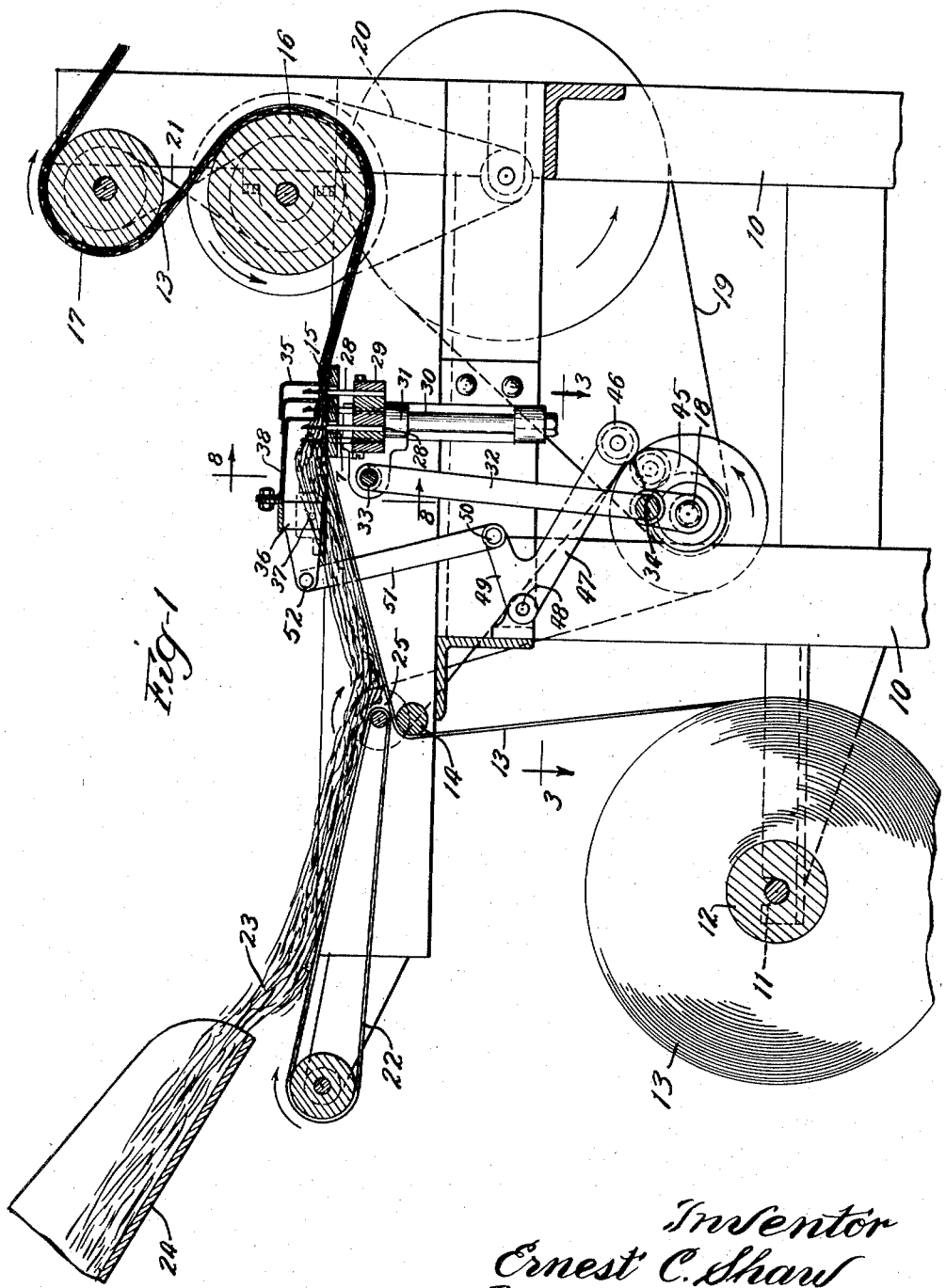
Fig. 1 is a diagrammatic view of a machine or apparatus for making the material, shown partly in side elevation and partly in section.

In Figs. 1, 2, 3, 4, and 8, the numeral 10 indicates generally the frame of a machine or apparatus providing bearings 11 for a roll 12 of woven fabric 13 adapted to be drawn over a guide roller 14 and a hooking bar 15, both mounted on the frame 10, and thence about guide rolls 16 and 17 in travel toward a winder or other suitable apparatus.

The roll 16 is driven from a main shaft 18 through belt drives 19 and 20, and the roll 17 is driven by a cross belt drive 21 from the roll 16. The frame 10 is equipped with a conveyor 22 receiving unwoven material, such as waste, from a tapered trough 24, which in turn receives that material from a source of supply, such as a carding machine, waste puller, or a feeder.

The conveyor 22 delivers the unwoven waste material at the right end 25 onto the woven material between the roller 14 and the hooking bar 15, and it will be well to make the delivery run of the conveyor 22 approach the web so closely that there will be no tendency for the waste to follow the conveyor around instead of feeding onto the woven material. This is accomplished by making the corresponding guide pulley of the conveyor quite small.

After being brought together, the woven fabric and the relatively thick layer of waste travel to the right in Fig. 1 over the hooking bar 15, which is provided with openings 7 for needles 28 carried by a needle bar 29 adapted to reciprocate up and down on guides 30 to which it is secured by brackets 31.

The needle bar is reciprocated by connecting rods 32 having their upper ends pivoted to the bar at 33 and their lower ends to cranks 34 on the main shaft 18.

A relatively thick layer of unwoven material, such as cotton waste, is easily penetrated by needles if it is loose and free to rise and spread, but not if it is compacted or confined. In this machine, it has been found important to force the unwoven material over the needles in order to insure that they will, or most of them will, pass through the layer of waste material on one stroke, and, on the opposite stroke, will catch and draw threads of the waste through the relatively thick layer and through the fabric.

For this purpose, use is made of bars 35 of sheet metal (Fig. 4) resiliently mounted on a rocker 36 pivoted on the frame 10 to rock about an axis 37 between positions corresponding to those shown in solid and dotted lines in Fig. 4.

Figure 8:
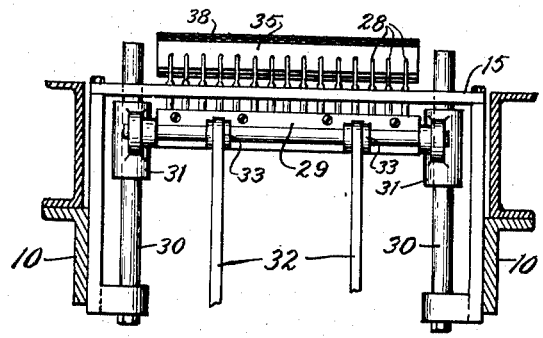
Fig. 8 is a vertical section on the line 8—8 of Fig. 1.
Figure 9:
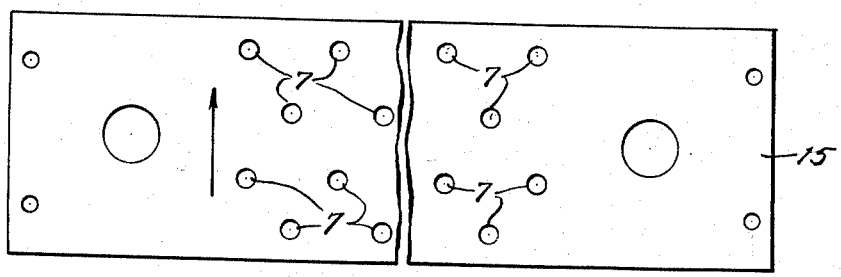
Fig. 9 is a plan view of the hooking bar used in the machine.
Figure 10:
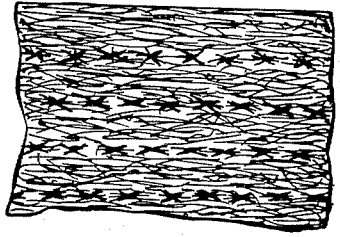
Fig. 10 is a plan view of the material, the unwoven waste being uppermost.

The needles are in rows extending across the machine and spaced substantially as shown in Figs. 4 and 8, and the pressure bars 35 extend crosswise adjacent to the rows of needles in order to act upon the unwoven material and force it down over the needles.

In this instance, they are made of sheet metal bent and fastened to a resilient arm 38, in turn fastened to the rocker 36.

As shown in Fig. 4, pressure bars straddle the third and fourth row of needles, considering the direction of movement of the material, and the first bar 35 acts on the waste about the second row of needles. It is also to be noted that the three pressure bars shown in Fig. 4 are stepped as to length vertically, grading the pressure accordingly, as the unwoven material is more and more made fast to the woven material. They are forced down as the needles approach top position and promptly lifted to avoid drag on the waste. Pressure bars 35 are omitted in advance of the first two rows of needles to avoid possible bunching and retarding the movement during the initial fastening.

The fingers are lifted to leave the waste free to open and shift as the needles rise, and are forced downwardly to force the unwoven material over the needles before the latter descends and, by the hooks 40 on their upper ends, catch and pull the threads 41 of the unwoven material through the fabric 13.

As here illustrated, the rocker 36 is operated by cams 45 on the shaft 18 running against antifriction rollers 46 on the free end of one arm 47 of bell crank levers fulcrumed at 48, the other arm 49 of which is pivoted at 50 to connecting rods 51 pivoted at 52 to the rocking bar.

The shape of the cams 45 will be varied to suit conditions, but, as a general rule, it will be well to have the pressure bars 35 up when the needles 28 start to penetrate the unwoven material in order to allow it to open up and admit the hooked ends of the needles as well as possible, depending on the density and thickness of the unwoven material. As the hooked ends approach their upper position when driven by a crank there is a time interval in which the needle movement is relatively small, and it is then that the pressure bars may well be applied in order to push the unwoven material down beyond the hooks so that, upon the down stroke of the needles, the hooks will catch threads and pull them through substantially as illustrated in Fig. 6.

It is important that the hooks 40 of the needles 28 be at an angle to the direction of travel of the woven material 13 and the waste; and, generally speaking, it will be preferable to have those hooks extend at 45 degrees to the direction of travel, and generally in the direction of travel instead of contrary. They are similar to barbless fishhooks. This will insure engagement of the hooks with the threads of the unwoven material, even when the threads run substantially parallel.

It is also important to provide the body of the needle with the portion 57 (Figs. 4 and 5) relatively large for the purpose of spreading the threads of the woven material 13, as indicated diagrammatically in Fig. 7, and the enlargement may well be, as here shown, of greater radial dimensions than the bight of the hooks 40 so that the hooks will not catch threads of the woven material as they descend. The spreading is temporary but sufficient.

The openings in the hooking bar 15 are relatively large as compared with the enlargements 57 of the needles, and the needles are sufficiently resilient to bend as the woven material passes on while they are in and about the positions shown in Figs. 1 and 4, and threads press against them.

Figure 11:
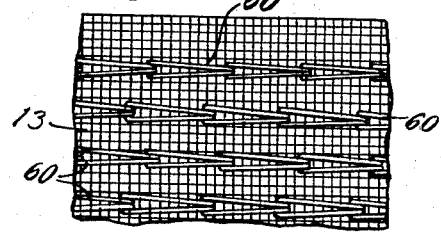
Fig. 11 is a view of the reverse side indicating the loops of the waste threads on the under side of the fabric.

In performing the operations described, those needles catch threads of the unwoven material, such as cotton waste, and pull them down through the fabric 13, and preferably they descend far enough below the fabric to leave a considerable loop below the sheet. In many instances, particularly where the arrangement corresponds to that here shown, the interfacing of those loops to the woven fabric will result in virtually knitting the unwoven fabric to the woven fabric, as diagrammatically illustrated at 60 in Fig. 11. In many instances, this has a decided advantage. However, it is to be understood that actual loops are not always produced and are not indispensable to all uses of the material, for short straight threads of unwoven fiber pulled through the woven material will inherently form a fastening.

In my prior application, Ser. No. 85,108, filed April 2, 1949, a tucker was disclosed to bunch and tuck the unwoven material as it approaches the hooking bar. That feature has its advantages under some conditions and with some materials, but it is omitted from the illustration here in order to avoid confusion or apparent complexity of the drawing, and may be omitted in practice.

Waste delivered from a carding machine or waste puller has the threads arranged mainly parallel—those near the bottom of the layer more nearly so than those toward the top. A tucker after the fashion disclosed in the mentioned application insures that there will be threads in the path of the needles because it bends them and makes them overlap in many directions. With the apparatus disclosed in this application, a similar effect can be had by running the conveyor 22 faster than the cheesecloth 13. The greater the relative speed of the conveyor 22, the greater the bunching and bending.

Figure 12:
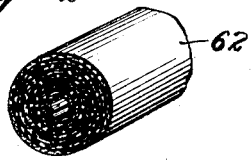
Fig. 12 is a diagrammatic view of a rolled oil filter packing including the basic material of this invention.

The basic material produced by this invention may be used in sheets, rolls, piles, or folds, or other forms, depending on the nature of the use. One form to which it is especially adapted is a roll 62 (Fig. 12) forming a cartridge or filler for an oil filter. When the composite sheet is rolled to form a filter cartridge, it can be made denser or more compact at the outer side by increasing the tension as the roll builds up, or denser toward the interior by the reverse variation in tension. If the oil is to pass through the roll from the outer side, it is often best to have the tension decrease as the roll enlarges, so that the outer portion will be more pervious than the inner, and the solid material in the oil can penetrate a short distance, depending on its size, and increase the filtering ability of the material by building up a bed of extraneous solids to be removed from the oil.

It is also an important feature of the filter cartridge made of the basic material of this invention that the warp threads continually bind it circumferentially while the woof threads restrain its elongation lengthwise to the cartridge. Hence, the threads of woven material strongly tend to maintain the size and form of the roll cartridge, although it will allow the cartridge to yield from radial outward pressure of entering oil and expand back to its original, or substantially its original, condition after the pressure is relieved, thus giving the cartridge a sort of breathing action which serves to shed excess extraneous material from the outside.

In a filter cartridge made according to this invention, the waste material is substantially uniform throughout, thereby presenting substantially uniform filtering throughout and avoiding the undesirable channeling that has been characteristic of waste filters in the past.

Such a filter cartridge lends itself to great uniformity in machine manufacture to the end that cartridges run in uniform size and present uniform filtering area throughout. It has been found that by using half the waste material ordinarily used in hand-packed waste filters, greater filtering capacity and longer useful life can be had. In instances, the increase is 100%. This is partly due to the fact that the waste is uniformly distributed and maintained uniformly distributed by being fastened to the fabric.

The basic material can also be formed into a flat filter suitable for incorporation in the side of an engine, such as an internal combustion engine, where it will be quickly heated—a practical impossibility with the filters embodying a separate container spaced from the jacket.

When used in journal boxes for packing, the fastening between the fabric and the unwoven material aids in preventing waste grab while making the unwoven material fast to the body of the packing, and the fastening can be made very extensive by numbers of loops.

In the preferred embodiment of the invention, the woven material is what is known as cheesecloth, and the unwoven material is what is known as carded waste, for which the Association of American Railroads, Mechanical Division, Specifications, M-905-41, adopted 1928, revised 1934, 1941, for New Waste for Journal Box Packing, will be found satisfactory.

However, for filtering lubricating oil, cotton waste alone will be preferred by many because it inhibits the passage of moisture and absorbs acids. In some uses, woven metal wire or plastic threads and a variety of loose or loosely felted fibers, vegetable and animal, will be suitable for the unwoven material.

The number of threads to be pulled from the unwoven material through the fabric for fastening is a variable depending somewhat upon the extent of the fastening desired or required. In many instances, a single row of needles reciprocating at a reasonable speed will give sufficient fastening for quantity production. In others, more rows of needles may be advantageously used. As herein shown, there are four rows of needles spaced $\frac{7}{8}''$ in the rows and $\frac{1}{2}''$ between rows. It has been found satisfactory in the manufacture of material for filter cartridges for lubricating oil to have each needle pass through the mass for each $\frac{1}{8}''$ to $\frac{1}{2}''$ of travel.

Of course, the number and arrangement of needles will be varied to suit conditions. The fastening may be increased toward the margin of the sheet to be formed, or toward the margin and toward the center, depending on how the sheet is to be cut and handled in making up filter cartridges and the like.

After fastening a layer of waste on a woven sheet, it may be turned over and another layer fastened to the opposite side, thus producing a three-layer sheet with the woven fabric in the middle and serving as a fastening for the unwoven material. This is especially good for journal box packing, though it may be used to advantage in filter cartridges. There is an advantage in rolling some filter cartridges with the woven fabric inside and wound on the perforated outlet tube, where it forms a final strainer to catch loose threads or fiber, and saves a separate element in the operation.

In others, such as large filters for lubricating oil or fuel oil, there is an advantage in rolling the cartridge with the woven fabric outside, where it serves to confine the cartridge, but freely permits yield to pressure from the outside.

This application is a continuation-in-part of my application Ser. No. 85,108, filed April 2, 1949, made to especially include the form and arrangement of the needles and the pressure bars.

I claim:

1. In a machine of the class described, means to feed a woven fabric and a relatively thick layer of waste together, a set of hooked needles, means to reciprocate said needles crosswise to the fabric and the waste, and means movable toward and away from the waste to press the waste over the needles in timed relation to the movement of the needles.

2. In a machine of the class described, means to feed a woven fabric and a relatively thick layer of waste together, a set of spaced, hooked needles, means to reciprocate said needles crosswise to the fabric and the waste, and pressure means moving toward and away from the waste substantially opposite to and between certain of the needles to force the waste beyond the hooks.

3. In a machine of the class described, a bar having needle openings therein, means to feed a woven fabric and a layer of waste material across the bar, a set of hooked needles, means to reciprocate said needles through the openings in the bar, and means to intermittently press the waste and the fabric toward the bar in timed relation to the reciprocation of the needles.

4. In a machine of the class described, a bar having needle openings therein, means to feed a woven fabric and a layer of waste material across the bar, a set of hooked needles, means to reciprocate said needles through the openings in the bar, and pressure bars moving substantially opposite to and in timed relation to the needles to press the waste against the bar.

5. In a machine for hooking threads of waste through a woven fabric, means for separately supplying a strip of the fabric and a layer of loose waste to a common junction point with the waste being supplied to the top of the fabric, a set of hooked needles, means for reciprocating said needles initially upwardly through the fabric and then into the waste and then withdrawing the needles downwardly to pull threads of the waste through the fabric, and spaced elements vertically movable in timed relation to operation of said needles to press the waste material and facilitate the penetration of the needles therethrough after the needles have moved through the fabric and into the waste.

6. In a machine for hooking threads of waste through a woven fabric, means for separately supplying a strip of the fabric and a layer of loose waste to a common junction point with the waste being supplied to the top of the fabric, a set of hooked needles, means for reciprocating said needles initially upwardly through the fabric and then into the waste and then withdrawing the needles downwardly to pull threads of the waste through the fabric, and a plurality of transverse presser bars offset from at least one needle on opposite sides thereof in the line of movement of the waste and fabric for pressing the waste downwardly with respect to said one needle to effect penetration thereof into the waste.

7. In a machine for hooking threads of waste through a woven fabric, means for separately supplying a strip of the fabric and a layer of loose waste to a common junction point with the waste being supplied to the top of the fabric, a set of hooked needles, means for reciprocating said needles initially upwardly through the fabric and then into the waste and then withdrawing the needles downwardly to pull threads of the waste through the fabric, a plurality of spaced presser bars extending transversely of the line of movement of the fabric and waste and offset in such line of movement from a plurality of needles, said presser bars being movable downwardly beyond the upper ends of the needles when the latter are at their upper limits of movement, and means for moving said presser bars upwardly and downwardly in timed relation to movement of the needles to press the waste downwardly therearound when said needles are adjacent their upper limits of movement.

8. In a machine for hooking threads of waste through a woven fabric, means for separately supplying a strip of the fabric and a layer of loose waste to a common junction point with the waste being supplied to the top of the fabric, a plate beneath and over which the fabric moves, said plate being provided with relatively large apertures, and a plurality of needles each vertically reciprocable through one of said apertures between upper and lower limits of movement, each needle having a hook at its upper end, a relatively thin shank projecting downwardly from said hook and a relatively thickened stem beneath said shank, the upper extremities of said stems extending at least to the top of said plate when said needles are at their upper limits of movement to form openings in the fabric which are relatively large to facilitate the pulling through such openings of threads of the fabric when said needles move downwardly.

9. In a machine for hooking threads of waste through a woven fabric, means for separately supplying a strip of the fabric and a layer of loose waste to a common junction point with the waste being supplied to the top of the fabric, a plate beneath and over which the fabric moves, said plate being provided with relatively large apertures, a plurality of needles each vertically reciprocable through one of said apertures between upper and lower limits of movement, each needle having a hook at its upper end, a relatively thin shank projecting downwardly from said hook and a relatively thickened stem beneath said shank, the upper extremities of said stems extending at least to the top of said plate when said needles are at their upper limits of movement to form openings in the fabric which are relatively large to facilitate the pulling through such openings of threads of the fabric when said needles move downwardly, and a plurality of presser bars extending transversely of the line of movement of the fabric and waste and offset in said line of movement from a plurality of said needles, said presser bars being movable upwardly to release pressure from the waste and downwardly to a position with their lower extremities below the hooks of the needles when the latter are adjacent their upper limits of movement to press the waste downwardly over said needles.

10. In a machine of the class described, means to feed together a woven fabric and a relatively thick layer of waste including a substantial number of threads lying parallel to the direction of feed, a set of hooked needles, and means to reciprocate said needles crosswise through the fabric and the waste with the hooks inclined diagonally in the direction of the feed of the fabric and the waste.

11. In a machine of the class described, means to feed together a woven fabric and a relatively thick layer of waste including a substantial number of threads lying parallel to the direction of feed, a set of needles, and means to reciprocate said needles through the fabric and entirely through the layer of waste, said needles each being provided with a short hook turned diagonally in the direction of travel of the fabric and the waste.

ERNEST C. SHAW.

References Cited in the file of this patent

UNITED STATES PATENTS

| Number | Name | Date |
| --- | --- | --- |
| 1,104,368 | Maussner | July 21, 1914 |
| 1,243,133 | Billington | Oct. 16, 1917 |
| 1,326,236 | Wagner | Dec. 30, 1919 |
| 1,332,549 | Fouler | Mar. 2, 1920 |
| 1,389,043 | Glasner | Aug. 30, 1921 |
| 1,454,049 | Genung | May 8, 1923 |
| 1,572,220 | Mudd | Feb. 9, 1926 |
| 1,898,027 | Winslow | Feb. 21, 1933 |
| 2,004,709 | Phillips | June 11, 1936 |
| 2,173,978 | Pennebaker | Sept. 26, 1939 |
| 2,297,440 | Szücs | Sept. 29, 1942 |
| 2,377,564 | Lundgren | June 5, 1945 |
| 2,391,560 | Foster | Dec. 25, 1945 |

FOREIGN PATENTS

| Number | Country | Date |
| --- | --- | --- |
| 483,156 | Germany | Oct. 17, 1931 |
| 498,765 | Great Britain | Jan. 13, 1939 |